(12) United States Patent
Katori

(10) Patent No.: US 6,802,478 B2
(45) Date of Patent: Oct. 12, 2004

(54) OVERHEAD STOWAGE BIN ON AIRCRAFT

(76) Inventor: Yoshinobu Katori, 33-4 Minamimagome 3-chome, Ota-ku, Tokyo (JP)

( * ) Notice: Subject to any disclaimer, the term of this patent is extended or adjusted under 35 U.S.C. 154(b) by 64 days.

(21) Appl. No.: 10/187,355

(22) Filed: Jul. 2, 2002

(65) Prior Publication Data
US 2003/0230958 A1 Dec. 18, 2003

(30) Foreign Application Priority Data
Jun. 12, 2002 (JP) .................................. 2002-171366

(51) Int. Cl.[7] ............................................. B64D 11/00
(52) U.S. Cl. ..................................... 244/118.1; 312/246
(58) Field of Search ................................. 312/245, 246, 312/247, 248; 244/118.1, 118.5, 119; 49/171; 109/21.5

(56) References Cited

U.S. PATENT DOCUMENTS

| | | | | |
|---|---|---|---|---|
| 1,576,656 A | * | 3/1926 | Honsinger | 109/21.5 |
| 1,639,148 A | * | 8/1927 | Redrup | 52/455 |
| 1,748,195 A | * | 2/1930 | Stevens | 52/455 |
| 1,869,266 A | * | 7/1932 | Manly | 109/21.5 |
| 3,203,052 A | * | 8/1965 | Curtis, Jr. | 49/70 |
| 4,368,937 A | * | 1/1983 | Palombo et al. | 312/325 |
| 4,676,041 A | * | 6/1987 | Ford | 52/309.11 |
| 5,035,471 A | * | 7/1991 | Ackerman | 312/291 |
| 5,269,111 A | * | 12/1993 | McDougall | 52/455 |
| 5,823,472 A | | 10/1998 | Luria | |
| 5,868,353 A | * | 2/1999 | Benard | 244/118.1 |
| 5,988,565 A | * | 11/1999 | Thomas et al. | 244/118.1 |
| 6,257,325 B1 | * | 7/2001 | Watanabe et al. | 165/153 |
| 6,290,175 B1 | * | 9/2001 | Hart et al. | 244/118.5 |
| 6,532,877 B1 | * | 3/2003 | Hepburn et al. | 105/404 |

FOREIGN PATENT DOCUMENTS

| | | |
|---|---|---|
| DE | 2545385 A1 | 4/1977 |
| DE | 7714208 U | 10/1977 |
| DE | 3630408 A1 | 7/1988 |
| EP | 0348130 A2 | 12/1989 |
| EP | 1114773 A2 | 7/2001 |
| JP | 01204942 A * | 8/1989 |
| JP | 2001031854 A * | 2/2001 |

OTHER PUBLICATIONS

European Search Report dated Dec. 2, 2003.

* cited by examiner

Primary Examiner—Leslie A. Braun
Assistant Examiner—Jon Szumny
(74) Attorney, Agent, or Firm—Rader, Fishman & Grauer PLLC

(57) ABSTRACT

An overhead stowage bin 100 mounted to a ceiling in a cabin of an aircraft comprises a shelf 102 fixed to the ceiling and a door 110 that covers the opening of said shelf. The door 110 is supported by hinges 120, and a knob 130 is equipped thereto. One or more transparent windows 150 are provided to a portion of the door 110, through which users can visually observe the status of use of the interior of the bin. The windows are located so that cabin crews etc. standing in the aisle of the cabin can easily observe the interior of the bin, without negatively affecting the strength of the bin.

8 Claims, 2 Drawing Sheets

OVERHEAD STOWAGE BIN ON AIRCRAFT

FIELD OF THE INVENTION

The present invention relates to an overhead stowage bin disposed above the passenger seats in a cabin of an aircraft.

DESCRIPTION OF THE RELATED ART

FIG. 5 is an explanatory view showing the outline of a conventional overhead stowage bin.

An aircraft denoted as a whole by reference number 1 comprises passenger seats 30 fixed on a floor 20 within a cabin 12 of an aircraft body 10.

Overhead stowage bins 40 are located above the seats 30.

The overhead stowage bin 40 is composed, for example, of a shelf member 54 fixed above the seats 30 and a door 50 mounted to the opening of the shelf member 54, the door 50 being mounted via hinges 52 that allow the door to be opened and closed.

According to the conventional overhead stowage bin 40, the shelf member 54 and the door 50 are formed of opaque structural members. The structure does not allow users to confirm the state of use of the stowage bin from the exterior.

Therefore, for example at times just prior to departure when stand-by passengers enter the cabin, the cabin crew must open the already-closed stowage bin doors to confirm whether there is vacant space left in the bins.

Such process imposes a heavy burden on the cabin crew, and causes undesired elongation of time required for preparation of departure.

SUMMARY OF THE INVENTION

Therefore, the present invention is intended to provide an overhead stowage bin for an aircraft that solves the above-mentioned problems of the prior art.

The overhead stowage bin according to the present invention is equipped with one or more transparent windows disposed at a portion on the front face of the stowage bin.

The overhead stowage bin comprises a shelf member fixed to a ceiling portion of a cabin, and a hinged door provided to the opening portion of the shelf member. Moreover, the stowage bin comprises a box-shaped body, having a structure that opens downward via hinges.

Moreover, the overhead stowage bin comprises a box-shaped body and a guiding mechanism for guiding the body, wherein the whole body is designed to open toward an oblique downward direction.

The transparent window is formed of reinforced flame-retardant resin (such as polycarbonate), and disposed at a position allowing the cabin crew standing in the aisle of the cabin to visually observe the interior of the bin through the window.

DETAILED DESCRIPTION OF THE PREFERRED EMBODIMENT

Figure 1:
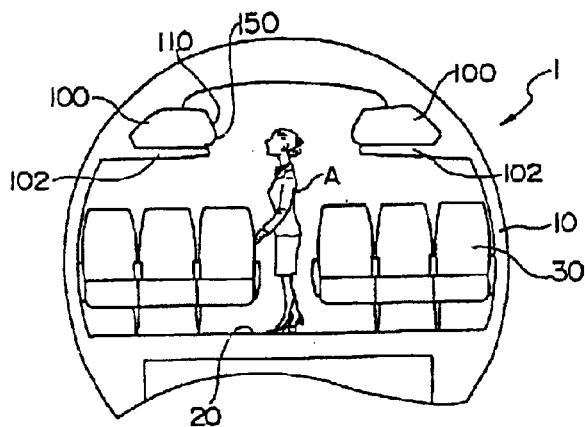
FIG. 1 is an explanatory view showing the first embodiment of the present invention.
Figure 2:
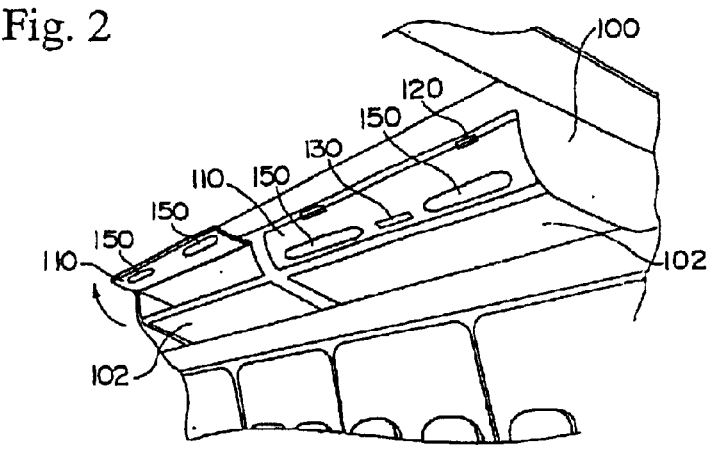
FIG. 2 is an explanatory view showing the main portion of the first embodiment of the present invention.

FIG. 1 is an explanatory view showing the outline of the present invention, and FIG. 2 is a perspective view showing the main portion of the present invention.

Seats 30 are fixed on a floor 20 of a body 10 of an aircraft 1. The overhead stowage bin 100 according to the present invention is disposed above the seats 30.

As shown in FIG. 2, the overhead stowage bin 100 is composed of a shelf member 102 fixed to the ceiling portion of the cabin and a door 110 mounted to the opening portion of the shelf member 102, the door 110 capable of being opened upward by hinges 120 mounted on the upper portion of the door.

A knob 130 for opening and closing the door is provided to the center area of the door 110, and transparent widows 150 are provided to appropriate portions on the door 110.

The transparent windows 150 are provided at locations where a cabin crew A standing on the aisle of the cabin can visually observe through the windows the interior of the closed door 110 of the stowage bin while the bin is in a stowed position.

The transparent windows 150 are formed for example by mounting reinforced flame-retardant (polycarbonate) resin plates and the like. The size and shape of each transparent window 150 is designed so that the task of confirming visually whether or not there is vacant space in the closed overhead stowage bin is performed successfully, but it is not required that the windows allow excessive observation of the interior of the bin.

Figure 3:
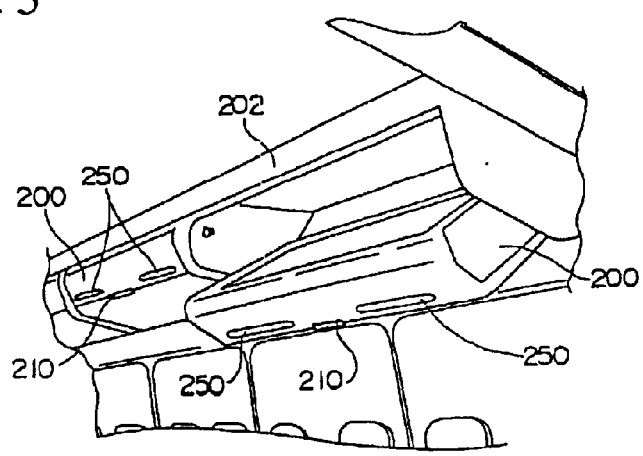
FIG. 3 is an explanatory view showing the second embodiment of the present invention.

FIG. 3 is an explanatory view of another embodiment of the present invention.

An overhead stowage bin 200 comprises a box-shaped body, which is mounted to a ceiling structure 202 of an aircraft so that the body opens downward via hinges not shown.

On the front face of the stowage bin 200 is disposed a knob 210 for opening and closing the bin, and transparent windows 250 disposed at the left and right sides of the knob 210. The windows are appropriately positioned so as to allow the state of use of the interior of the stowage bin to be confirmed easily while the bin is in the towed position, without negatively affecting the strength of the stowage bin.

Figure 4:
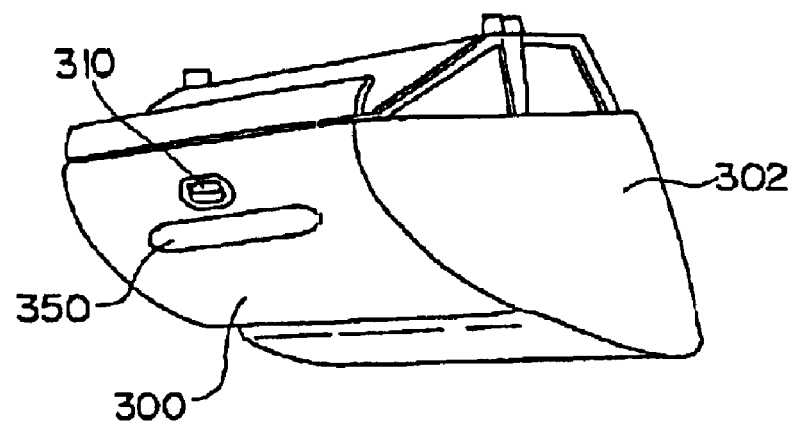
FIG. 4 is an explanatory view showing the third embodiment of the present invention.
Figure 5:
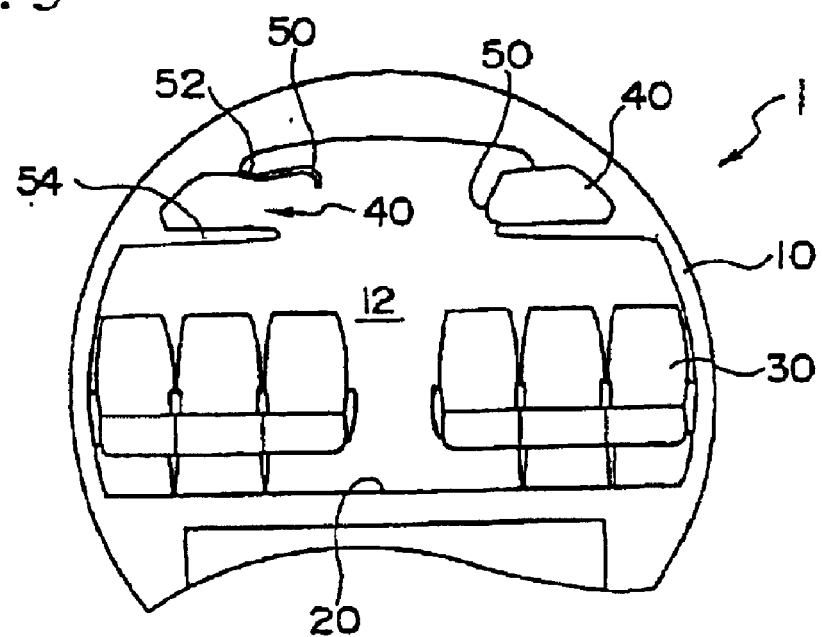
FIG. 5 is an explanatory view showing the overhead stowage bin of the prior art.

FIG. 4 is an explanatory view showing yet another embodiment of the present invention.

An overhead stowage bin 300 comprises a box-shaped body, which is mounted to a ceiling structure 302 of an aircraft so that the whole body opens toward the oblique downward direction via a guiding mechanism not shown.

On the front face of the stowage bin 300 is disposed a knob 350 that allows the bin to be opened and closed, and a transparent window 350 disposed adjacent the knob 310. The window is appropriately positioned so that it allows the status of use of the closed stowage bin to be confirmed easily while the bin is in the stowed position, without negatively affecting the strength of the bin.

As explained, the overhead stowage bin on an aircraft according to the present invention is equipped with a transparent window disposed on the front face of the bin, thus enabling the cabin crew or passenger standing in the aisle of the cabin to visually observe from the exterior whether there is vacant space within the stowage bin, without opening the door.

Since the status of use of the bin can be visually confirmed without opening the bin door, vacant space within bins can be found easily and the baggage of passengers can be disposed in the bins promptly.

Therefore, even when the passengers already on board the aircraft has stored their own baggage and closed the door of the stowage bins, the crew or passengers can find vacant space within the bins without opening the bin doors for storing the baggage of passengers coming later onto the aircraft, thus enabling the crew to complete departure preparation promptly, and as a result realizing a smooth, on-schedule air service.

What is claimed is:

1. An overhead stowage bin equipped above passenger seats in a cabin of an aircraft for stowing an object therein, comprising:

at least one slit-shaped, transparent window disposed at a lower one-half portion on a front face of said stowage bin and fabricated from a reinforced flame-retardant resin, the at least one slit-shaped transparent window extending horizontally across the front face a distance sufficient to view the object stowed in the overhead stowage bin, wherein the at least one slit-shaped transparent window has a length extending horizontally along the lower one-half portion of the front face of said stowage bin and a width extending perpendicularly to the length and the length is at least four times larger than the width and wherein the interior space of said stowage bin can be viewed when said stowage bin is in its stowed position.

2. The overhead stowage bin of an aircraft according to claim 1, wherein said stowage bin comprises a shelf member fixed to a ceiling portion of the cabin, and a hinged door mounted to the opening portion of said shelf member.

3. The overhead stowage bin of an aircraft according to claim 1, wherein said stowage bin comprises a box-shaped body, the bin structured so as to open toward the lower direction via hinges.

4. The overhead stowage bin of an aircraft according to claim 1, wherein said stowage bin comprises a box-shaped body and a guiding mechanism for said box-shaped body, the bin structured so that the whole body opens toward the oblique downward direction.

5. The overhead stowage bin of an aircraft according to claim 1, wherein said at least one window is formed of a polycarbonate.

6. The overhead stowage bin of an aircraft according to claim 1, wherein said at least one window is located so that cabin crews standing in the aisle of the cabin can visually observe the status of the bin easily.

7. The overhead stowage bin on an aircraft according to claim 1, wherein the at least one slit-shaped transparent window includes a first slit-shaped transparent window and a second slit-shaped transparent window disposed apart from the first slit-shaped transparent window, the first and second slit-shaped transparent windows extending along a common straight line in a lengthwise direction.

8. The overhead stowage bin on an aircraft according to claim 7, further comprising a knob disposed between the first and second slit-shaped transparent windows.

* * * * *